United States Patent
Holl et al.

(10) Patent No.: US 8,884,964 B2
(45) Date of Patent: Nov. 11, 2014

(54) FUNCTIONAL-BASED KNOWLEDGE ANALYSIS IN A 2D AND 3D VISUAL ENVIRONMENT

(75) Inventors: James E. Holl, Houston, TX (US);
Yao-Chou Cheng, Houston, TX (US);
Mark W. Dobin, The Woodlands, TX (US); John F. Schuette, Houston, TX (US); Chul-Sung Kim, Houston, TX (US); Eric A. Schmidtke, Middle Park (AU)

(73) Assignee: ExxonMobil Upstream Research Company, Houston, TX (US)

( * ) Notice: Subject to any disclaimer, the term of this patent is extended or adjusted under 35 U.S.C. 154(b) by 463 days.

(21) Appl. No.: 12/920,279

(22) PCT Filed: Mar. 9, 2009

(86) PCT No.: PCT/US2009/036545
§ 371 (c)(1),
(2), (4) Date: Aug. 30, 2010

(87) PCT Pub. No.: WO2009/131762
PCT Pub. Date: Oct. 29, 2009

(65) Prior Publication Data
US 2011/0044532 A1 Feb. 24, 2011

Related U.S. Application Data

(60) Provisional application No. 61/125,088, filed on Apr. 22, 2008.

(51) Int. Cl.
*G06T 11/20* (2006.01)
*G01V 1/34* (2006.01)
*G06F 17/30* (2006.01)

(52) U.S. Cl.
CPC ............ *G01V 1/34* (2013.01); *G06F 17/30554* (2013.01)
USPC ......................................... 345/440; 382/154

(58) Field of Classification Search
CPC .................................................. G01V 2210/66
USPC .......................................... 382/154; 345/440
See application file for complete search history.

(56) References Cited

U.S. PATENT DOCUMENTS 5,468,088 A  11/1995  Shoemaker et al.
5,708,764 A   1/1998  Borrel et al.
(Continued)

FOREIGN PATENT DOCUMENTS

CA     2312381    6/1999
WO     99/28767   6/1999
(Continued)

OTHER PUBLICATIONS

Gorodetsky (Multi-agent Technology for Distributed Data Mining and Classification, IEEE, 2003).*

(Continued)

*Primary Examiner* — Maurice L McDowell, Jr.
*Assistant Examiner* — Kyle Zhai
(74) *Attorney, Agent, or Firm* — ExxonMobil Upstream Research Company Law Department (57) ABSTRACT

A method of creating a visual display based on a plurality of data sources is provided. An exemplary embodiment of the method comprises extracting a set of extracted data from the plurality of data sources and processing at least a portion of the extracted data with a set of knowledge agents according to specific criteria to create at least one data assemblage. The exemplary method also comprises providing an integrated two-dimensional/three-dimensional (2D/3D) visual display in which at least one 2D element of the at least one data assemblage is integrated into a 3D visual representation using a mapping identifier and a criteria identifier.

22 Claims, 3 Drawing Sheets

(56) References Cited

U.S. PATENT DOCUMENTS

| | | | |
|---|---|---|---|
| 5,992,519 A | 11/1999 | Ramakrishman et al. | |
| 6,035,255 A | 3/2000 | Murphy et al. | |
| 6,044,328 A | 3/2000 | Murphy et al. | |
| 6,070,125 A | 5/2000 | Murphy et al. | |
| 6,219,061 B1 | 4/2001 | Lauer et al. | |
| 6,236,994 B1 | 5/2001 | Swartz et al. | |
| 6,353,677 B1 | 3/2002 | Pfister et al. | |
| 6,373,489 B1 | 4/2002 | Lu et al. | |
| 6,516,274 B2 | 2/2003 | Cheng et al. | |
| 6,519,568 B1 | 2/2003 | Harvey et al. | |
| 6,549,879 B1 | 4/2003 | Cullick et al. | |
| 6,643,656 B2 | 11/2003 | Peterson | |
| 6,757,613 B2 | 6/2004 | Chapman et al. | |
| 6,765,570 B1 | 7/2004 | Cheung et al. | |
| 6,766,254 B1 | 7/2004 | Bradford et al. | |
| 6,772,066 B2 | 8/2004 | Cook | |
| 6,823,266 B2 | 11/2004 | Czernuszenko et al. | |
| 6,826,483 B1 | 11/2004 | Anderson et al. | |
| 6,829,570 B1 | 12/2004 | Thambynayagam et al. | |
| 6,834,732 B2 | 12/2004 | Haarstad | |
| 6,912,467 B2 | 6/2005 | Schuette | |
| 6,912,468 B2 | 6/2005 | Marin et al. | |
| 6,980,939 B2 | 12/2005 | Dhir et al. | |
| 6,980,940 B1 | 12/2005 | Gurpinar et al. | |
| 6,993,434 B2 | 1/2006 | Cheng et al. | |
| 7,003,439 B2 | 2/2006 | Aldred et al. | |
| 7,027,925 B2 | 4/2006 | Terentyev et al. | |
| 7,031,842 B1 | 4/2006 | Musat et al. | |
| 7,050,953 B2 | 5/2006 | Chiang et al. | |
| 7,079,953 B2 | 7/2006 | Thorne et al. | |
| 7,096,172 B2 | 8/2006 | Colvin et al. | |
| 7,098,908 B2 | 8/2006 | Acosta et al. | |
| 7,136,064 B2 | 11/2006 | Zuiderveld | |
| 7,181,380 B2 | 2/2007 | Dusterhoft et al. | |
| 7,203,342 B2 | 4/2007 | Pedersen | |
| 7,248,258 B2 | 7/2007 | Acosta et al. | |
| 7,281,213 B2 | 10/2007 | Callegari | |
| 7,283,941 B2 | 10/2007 | Horowitz et al. | |
| 7,314,588 B2 | 1/2008 | Blankenship | |
| 7,330,791 B2 | 2/2008 | Kim et al. | |
| 7,337,067 B2 | 2/2008 | Sanstrom | |
| 7,362,329 B2 | 4/2008 | Zuiderveld | |
| 7,366,616 B2 | 4/2008 | Bennett et al. | |
| 7,437,358 B2 | 10/2008 | Arrouye et al. | |
| 7,451,066 B2 | 11/2008 | Edwards et al. | |
| 7,460,957 B2 | 12/2008 | Prange et al. | |
| 7,478,024 B2 | 1/2009 | Gurpinar et al. | |
| 7,512,543 B2 | 3/2009 | Raghuraman et al. | |
| 7,539,625 B2 | 5/2009 | Klumpen et al. | |
| 7,548,873 B2 | 6/2009 | Veeningen et al. | |
| 7,565,243 B2 | 7/2009 | Kim et al. | |
| 7,576,740 B2 | 8/2009 | Dicken | |
| 7,596,481 B2 | 9/2009 | Zamora et al. | |
| 7,603,264 B2 | 10/2009 | Zamora et al. | |
| 7,606,666 B2 | 10/2009 | Repin et al. | |
| 7,616,213 B2 | 11/2009 | Chuter | |
| 7,627,430 B2 | 12/2009 | Hawtin | |
| 7,630,914 B2 | 12/2009 | Veeningen et al. | |
| 7,657,407 B2 | 2/2010 | Logan | |
| 7,657,414 B2 | 2/2010 | Zamora et al. | |
| 7,668,700 B2 | 2/2010 | Erignac et al. | |
| 7,684,929 B2 | 3/2010 | Prange et al. | |
| 7,725,302 B2 | 5/2010 | Ayan et al. | |
| 7,743,006 B2 | 6/2010 | Woronow et al. | |
| 7,796,468 B2 | 9/2010 | Kellogg | |
| 7,814,989 B2 | 10/2010 | Nikolakis-Mouchas et al. | |
| 7,913,190 B2 | 3/2011 | Grimaud et al. | |
| 7,925,483 B2 | 4/2011 | Xia et al. | |
| 7,953,585 B2 | 5/2011 | Gurpinar et al. | |
| 7,953,587 B2 | 5/2011 | Bratton et al. | |
| 7,970,545 B2 | 6/2011 | Sanstrom | |
| 7,986,319 B2 | 7/2011 | Dommisse et al. | |
| 8,005,658 B2 | 8/2011 | Tilke et al. | |
| 8,073,664 B2 | 12/2011 | Schottle et al. | |
| 8,145,464 B2 | 3/2012 | Arnegaard et al. | |
| 8,155,942 B2 | 4/2012 | Sarma et al. | |
| 8,301,426 B2 | 10/2012 | Abasov et al. | |
| 8,381,815 B2 | 2/2013 | Karanikas et al. | |
| 2001/0027456 A1* | 10/2001 | Lancaster et al. | 707/104.1 |
| 2002/0177955 A1 | 11/2002 | Jalali et al. | |
| 2003/0071814 A1* | 4/2003 | Jou et al. | 345/440 |
| 2004/0012670 A1 | 1/2004 | Zhang | |
| 2004/0054475 A1* | 3/2004 | Grace | 702/1 |
| 2004/0207652 A1 | 10/2004 | Ratti et al. | |
| 2004/0268338 A1 | 12/2004 | Gurpinar et al. | |
| 2005/0119959 A1 | 6/2005 | Eder | |
| 2005/0171700 A1 | 8/2005 | Dean | |
| 2006/0224423 A1 | 10/2006 | Sun et al. | |
| 2006/0247903 A1 | 11/2006 | Schottle | |
| 2006/0265508 A1 | 11/2006 | Angel et al. | |
| 2007/0199721 A1 | 8/2007 | Givens et al. | |
| 2007/0234230 A1 | 10/2007 | Pedersen | |
| 2007/0266082 A1 | 11/2007 | McConnell et al. | |
| 2007/0276639 A1* | 11/2007 | Montaron et al. | 703/10 |
| 2008/0088621 A1 | 4/2008 | Grimaud et al. | |
| 2008/0165185 A1 | 7/2008 | Smith et al. | |
| 2008/0165186 A1 | 7/2008 | Lin | |
| 2008/0243749 A1 | 10/2008 | Pepper et al. | |
| 2008/0297510 A1 | 12/2008 | Callegari | |
| 2008/0306803 A1 | 12/2008 | Vaal et al. | |
| 2009/0027380 A1 | 1/2009 | Rajan et al. | |
| 2009/0027385 A1 | 1/2009 | Smith | |
| 2009/0037114 A1 | 2/2009 | Peng et al. | |
| 2009/0043507 A1 | 2/2009 | Dommissee et al. | |
| 2009/0089028 A1 | 4/2009 | Sagert et al. | |
| 2009/0125362 A1 | 5/2009 | Reid et al. | |
| 2009/0157367 A1 | 6/2009 | Meyer et al. | |
| 2009/0182541 A1 | 7/2009 | Crick et al. | |
| 2009/0198447 A1 | 8/2009 | Legendre et al. | |
| 2009/0205819 A1 | 8/2009 | Dale et al. | |
| 2009/0222742 A1 | 9/2009 | Pelton et al. | |
| 2009/0229819 A1 | 9/2009 | Repin et al. | |
| 2009/0240564 A1 | 9/2009 | Boerries et al. | |
| 2009/0295792 A1 | 12/2009 | Liu et al. | |
| 2009/0299709 A1 | 12/2009 | Liu | |
| 2009/0303233 A1 | 12/2009 | Lin et al. | |
| 2010/0053161 A1 | 3/2010 | Chuter | |
| 2010/0171740 A1 | 7/2010 | Andersen et al. | |
| 2010/0172209 A1 | 7/2010 | Miller et al. | |
| 2010/0191516 A1 | 7/2010 | Benish et al. | |
| 2010/0206559 A1 | 8/2010 | Sequeira, Jr. et al. | |
| 2010/0214870 A1 | 8/2010 | Pepper et al. | |
| 2010/0225642 A1 | 9/2010 | Murray et al. | |
| 2010/0283788 A1 | 11/2010 | Rothnemer et al. | |
| 2011/0029293 A1 | 2/2011 | Petty et al. | |
| 2011/0044532 A1 | 2/2011 | Holl et al. | |
| 2011/0054857 A1 | 3/2011 | Moguchaya | |
| 2011/0060572 A1 | 3/2011 | Brown et al. | |
| 2011/0074766 A1 | 3/2011 | Page et al. | |
| 2011/0107246 A1 | 5/2011 | Vik | |
| 2011/0115787 A1 | 5/2011 | Kadlee | |
| 2011/0153300 A1 | 6/2011 | Holl et al. | |
| 2011/0161133 A1 | 6/2011 | Staveley et al. | |
| 2012/0150449 A1 | 6/2012 | Dobin | |
| 2012/0166166 A1 | 6/2012 | Czernuszenko | |

FOREIGN PATENT DOCUMENTS

| | | |
|---|---|---|
| WO | 00/14574 | 3/2000 |
| WO | 01/37003 | 5/2001 |
| WO | WO 03/003053 | 1/2003 |
| WO | 03/072907 | 9/2003 |
| WO | 03/078897 | 9/2003 |
| WO | 2005/020044 | 3/2005 |
| WO | 2006/029121 | 3/2006 |
| WO | 2007/076044 | 7/2007 |
| WO | 2007/100703 | 9/2007 |
| WO | 2008/121950 | 10/2008 |
| WO | 2009/032416 | 3/2009 |
| WO | 2009/039422 | 3/2009 |
| WO | 2009/079160 | 6/2009 |
| WO | WO 2009/075946 | 6/2009 |

(56) References Cited

FOREIGN PATENT DOCUMENTS

| WO | 2009/080711 | 7/2009 |
|---|---|---|
| WO | 2009/148681 | 12/2009 |
| WO | 2011/038221 | 3/2011 |

OTHER PUBLICATIONS

Bharat, K. et al. (2001), "Who Links to Whom: Mining Linkage between Web Sites", Proceedings of the 2001 IEE Int'l. Conf. on Data Mining, pp. 51-58.
Crawfis, R. et al. (1992), "Direct volume visualization of three-dimensional vector fields", Proceedings of the 1992 Workshop on Volume Visualization, pp. 55-60.
Deo, Narsingh, "Graph Theory with Application to Engineering and Computer Science", Prentice-Hall Inc., pp. 1-11.
Gibson D. et al. (2005), Discovering Large Dense Subgraphs in Massive Graphs, Proceedings of the 31$^{st}$ VLDB Conf., Trondheim, Norway, pp. 721-732.
"Introduction to AVS/Express, AVS/Express Field data type", Advanced Visual Systems Inc., Chapter 2, http:/help.avs/com/Express/doc/help/books/dv/dvfdtype.html, 30 pgs.
Miller, M. et al. (1998), "Simulation Steering with SCIRun in a Distributed Environment", University of Utah, http://www.cs.utah.edu/~sci, 11 pgs.
Mothe, J. et al. (2006), "Combining Mining and Visualization Tools to Discover the Geographic Structure of a Domain", Institute de Recherche en Informatique de Toulouse, 30 pgs.
Parker, S.G. et al. (1995), "SCIRun: A Scientific Programming Environment for Computational Steering", Proceedings of the IEEE/ACM SC95 Conf., Dec. 3, 1995, pp. 52-59.
"SCIRun User Guide", Chpts. 1-3, Center for Integrative Biomedical Computing Scientific Computing & Imaging Institute, Unversity of Utah, http://software.sci.utah.edu, pp. 1-37.
Wada, Y. et al. (1997), "A Multi-Agent Approach to a Distributed Schedule Management System", Fujitsu Sci. Tech. J. 33(2), pp. 196-210.
*European Search Report*, dated Apr. 6, 2009, EP 08159869.
*International Search Report and Written Opinion*, dated Apr. 23, 2009, PCT/US2009/036545.
Cabral, B., et al (1995), "Accelerated Volume Rendering and Tomographic Reconstruction Using Texture Mapping Hardware", *IEEE in Symposium on Volume Visualization*, pp. 91-98, 131.
Drebin, R., et al. (1988), "Volume Rendering", *Computer Graphics, the Proceedings of 1988 SIGGRAPH Conference*, vol. 22, No. 4, pp. 65-74.
Lorensen, W., et al., (1987), "Marching Cubes: A High-Resolution 3D Surface Construction Algorithm", *Computer Graphics, The Proceeding of 1987 SIGGRAPH Conference*, vol. 21, No. 4, pp. 163-169.
McCann, P., et al. (2003), "Horizontal Well Path Planning and Correction Using Optimization Techniques," *J. of Energy Resources Tech*. 123, pp. 187-193.
Mugerin. C., et al. (2002), "Well Design Optimization: Implementation in GOCAD," 22$^{nd}$ Gocade Meeting, Jun. 2002.
Rainaud, J.F., et al. (2004), "WOG—Well Optimization by Geosteering: A Pilot Software For Cooperative Modeling On Internet," *Oil & Gas Science & Tech*. 59(4), pp. 427-445.
Reed, P., et al. (2003) "Simplifying Multiobjective Optimization Using Genetic Algorithms," Proceedings of World Water and Environmental Resources Congress, 10 pgs.
Udoh, E., et al. (2003), "Applicatons of Strategic Optimization Techniques To Development and Management of Oil and Gas Resources", 27$^{th}$ SPE Meeting, 16 pgs.
*European Search Report*, dated Jul. 19, 2009, EP 09150617.
*International Search Report and Written Opinion*, dated Aug. 17, 2009, PCT/US2009/049594.

\* cited by examiner

FUNCTIONAL-BASED KNOWLEDGE ANALYSIS IN A 2D AND 3D VISUAL ENVIRONMENT

CROSS-REFERENCE TO RELATED APPLICATION

This application is the National Stage of International Application No. PCT/US2009/036545, that published as WO 2009/131762, filed 9 Mar. 2009, which claims the benefit of U.S. Provisional Application No. 61/125,088, filed 22 Apr. 2008, each of which is incorporated herein by reference, in its entirety, for all purposes.

FIELD OF THE INVENTION

The present invention relates to improving the creation of visualizations of data. In particular, an exemplary embodiment of the present invention relates to a system and method for integrating a wide range of data sources and producing an integrated two-dimensional (2D)/three-dimensional (3D) visual display based on the data.

BACKGROUND OF THE INVENTION

Three-dimensional model construction and visualization has been widely accepted by numerous disciplines as a mechanism for analyzing, communicating, and comprehending complex 3D relationships. Examples of structures that can be subjected to 3D analysis include the earth's subsurface, facility designs and the human body.

An architecture known in the art as a data flow pipeline has been used by the research institutes and industries in computational environments to facilitate visual programming for building algorithmic pipelines. Commercial and research products such as AVS/Express provided by Advanced Visual Systems (www.avs.com) and SCIRun provided by the Scientific Computing and Imaging Institute (software.sci.utah.edu/scirun.html) utilize data flow pipelines to provide 3D representations of data. Both AVS/Express and SCIRun also provide user interface components that allow the assembly of computational elements for graphic rendering and viewing manipulation of a 3D display.

Graphic icons have been used in data files commonly referred to as "web pages" because of the accessibility of such data files via the World Wide Web (WWW). Graphic plots may convey a graphic abstraction of data and provide inference handlers (linkages) to related information on the World Wide Web environment as well as 3D graphic display. One example of the use of graphical images web pages is disclosed in U.S. Pat. No. 5,708,764 to Borrel et al., the contents of which are hereby incorporated by reference as though fully set forth herein. The interconnected network of the information in this kind of architecture provides convenient ways to represent a snap shot of the underlying data model which allows users to navigate the information interactively. The graphic icons in the display window also permit the user to select additional displays showing detailed information in the corresponding network model.

In the field of artificial intelligence research, multi-agent technology has been used to provide a framework for designing and implementing software systems. One example of the use of multi-agent technology in this manner is disclosed in Yuji Wada, Masatoshi Shiouchi, Yuji Takada; "A Multi-Agent Approach to a Distributed Schedule Management System"; Jun. 11, 1997, the contents of which are hereby incorporated by reference as though fully set forth herein. In such a system, resources and capabilities are distributed across a network of interconnected agents. The framework has been used in areas such as supply-chain management, collaboration and planning.

With respect to providing visualizations of data regarding a 3D earth model, the current practices generally relate to processing and visualizing the geological data types such as seismic volumes, a geo-modeling grid, fault surfaces, horizon grids and well data. Many engineering and geoscience data types, however, may be point or non-spatial data, which may be difficult to represent in conjunction with 3D data such as a visualization of a subsurface environment. Examples of such data types include drilling information, daily/monthly production data, geochemical or geomechanical analysis results, production measurements or the like. Effective incorporation of such 2D data into a 3D visual representation has proven to be a challenging problem. An improved system and method that effectively incorporates non-spatial data, point data, observational data, multidimensional data or the like into a 3D visualization is desirable.

SUMMARY OF THE INVENTION

A method of creating a visual display based on a plurality of data sources is provided. An exemplary embodiment of the method comprises extracting a set of extracted data from the plurality of data sources and processing at least a portion of the extracted data with a set of knowledge agents according to specific criteria to create at least one data assemblage. The exemplary method also comprises providing an integrated two-dimensional/three-dimensional (2D/3D) visual display in which at least one 2D element of the at least one data assemblage is integrated into a 3D visual representation using a mapping identifier and a criteria identifier.

In addition, a system for creating a visual display is provided herein. An exemplary embodiment of the system comprises a plurality of data sources. The exemplary system also comprises a data access agent that is adapted to extract a set of extracted data from the plurality of data sources and a set of knowledge agents that are adapted to process the extracted data according to specific criteria to create at least one data assemblage. Further, the exemplary system comprises a display agent that is adapted to provide an integrated two-dimensional/three-dimensional (2D/3D) visual display in which at least one 2D element of at least one data assemblage is integrated into a 3D visual representation using a mapping identifier and a criteria identifier.

One exemplary embodiment of the present invention is manifested as a tangible machine-readable medium, such as a memory device in a computer system. The exemplary tangible machine-readable medium comprises code adapted to extract a set of data from a plurality of data sources and code adapted to correspond to a set of knowledge agents that process at least a portion of the extracted data according to specific criteria to create at least one data assemblage. The exemplary tangible machine-readable medium also comprises code adapted to provide an integrated two-dimensional/three-dimensional (2D/3D) visual display in which at least one 2D element of the at least one data assemblage is integrated into a 3D visual representation using a mapping identifier and a criteria identifier.

In one exemplary embodiment, the visual display corresponds to a subsurface region. The plurality of data sources may represent a 3D earth model.

In accordance with the present invention, the set of knowledge agents may comprise at least one data access agent, at least one spatial selection agent, at least one logical selection agent, at least one data mining agent or at least one display agent. In one exemplary embodiment, a visual control panel corresponding to the integrated 2D/3D visual display may be created by storing a state of at least one of the set of knowledge agents.

In one exemplary embodiment, the criteria identifier comprises a graphic plot. In another exemplary embodiment, the criteria identifier corresponds to at least one of the specific criteria.

DESCRIPTION OF THE DRAWINGS

The advantages of the present invention will be better understood by referring to the following detailed description and the attached drawings, in which.

DETAILED DESCRIPTION OF THE INVENTION

An exemplary embodiment of the present invention effectively combines the ability to present 3D data with other types of data from a variety of sources. One exemplary embodiment of the present invention is adapted for use in providing a visualization of data relating to a 3D shared earth environment. Examples of point or non-spatial data that may be incorporated into such a visualization include drilling information, daily/monthly production data, geochemical or geomechanical analysis results, production measurements or the like. Such point or non-spatial data types are typically not stored or displayed within a 3D earth model. Instead, the point or non-spatial data tends to be stored in databases or spreadsheets and displayed as 2D diagrams (e.g. XY plots, pie charts or the like). Comprehension of these data types, however, could be improved by effectively and interactively integrating the data into 3D models. Moreover, the usefulness of the data to predict or explain subsurface phenomena and aid in the placement and/or design of surface facilities (for example, drilling/production platforms or reservoir surveillance) could be improved by successfully integrating a representation of the point and/or non-spatial data into a visualization of a 3D earth model.

An exemplary embodiment of the present invention relates to a system and method for linking engineering and geoscience data dynamically. In addition, such an exemplary embodiment provides an opportunity for geoscientists and engineers to assemble data analysis processes such as data mining, statistical analysis, time-dependent data analysis, quantitative analysis of uncertainty or the like to make better decisions within a 3D shared earth environment.

Figures 1, 1A:
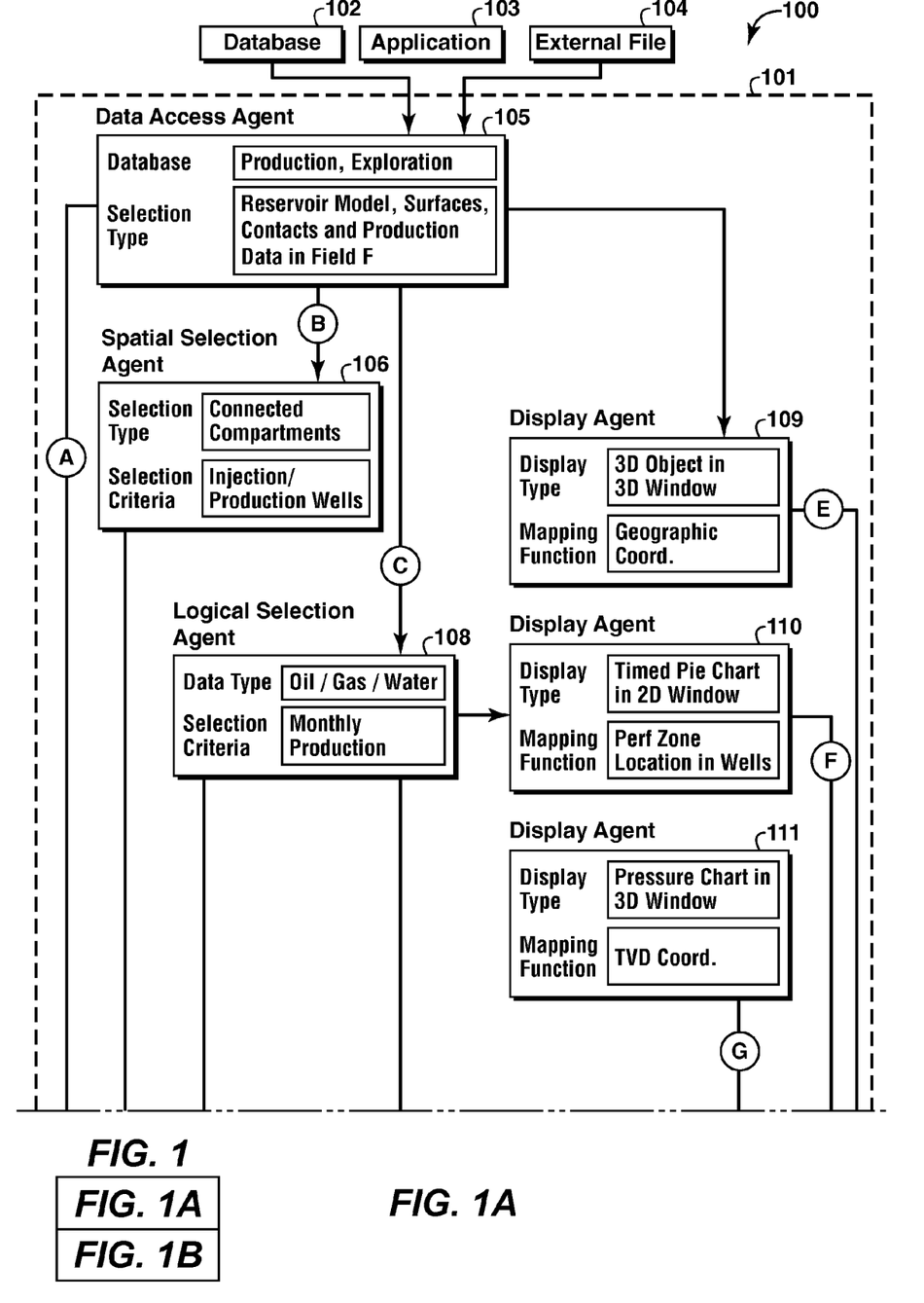
FIGS. 1A and 1B are parts of a block diagram of a multi-agent framework that is adapted to create a visualization of data in a 2D/3D environment in accordance with an exemplary embodiment of the present invention.
Figure 1B:
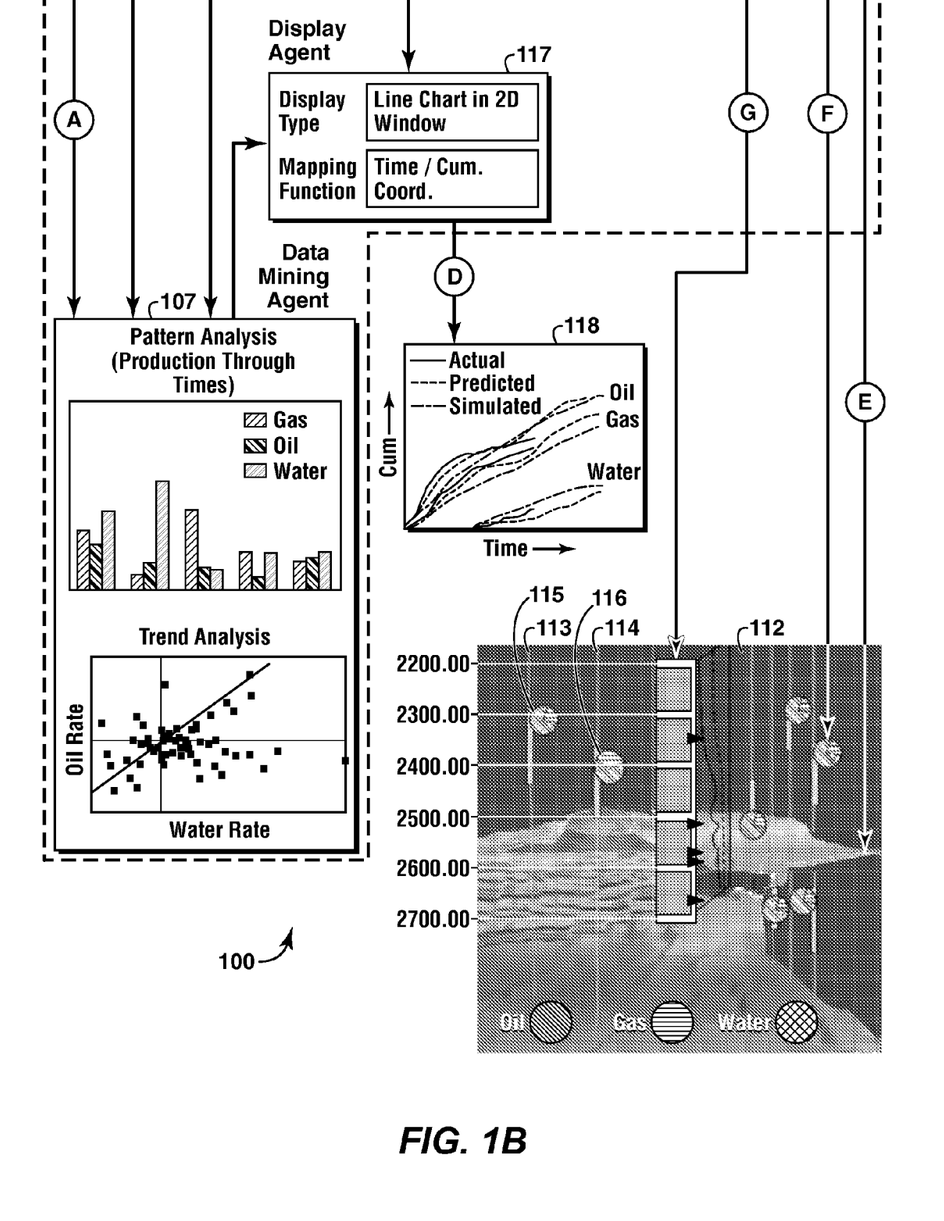

FIGS. 1A and 1B are parts of a block diagram of a multi-agent framework that is adapted to create a visualization of data in a 2D/3D visual environment in accordance with an exemplary embodiment of the present invention. The block diagram is generally referred to by the reference number 100. The block diagram 100 depicts a computer system 101 that is adapted to support the execution of a plurality of agents that have different functions with respect to processing data about a particular 2D/3D visual environment. Those of ordinary skill in the art will appreciate that the computer system 101 may comprise a single CPU system or a multi-computer network, including a distributed network. In addition, the computer system 101 comprises at least one tangible machine-readable medium, which may be a memory device. An exemplary embodiment of the present invention is adapted to receive data from a variety of sources. For example, the computer system 101 may be adapted to receive data from a database 102, an application program 103 and/or an external file 104. Examples of data that may be provided to the computer system include seismic survey volumes, geological/geophysics data, time-variant data, geological/reservoir modeling results, well data, drilling profiles, production data, completion information or the like, to name just a few examples.

The computer system 101 is adapted to support the operation of a multi-agent framework that includes a plurality of different types of knowledge agents, each type of knowledge agent being adapted to perform a different role in knowledge analysis of data about a 2D/3D environment. In the exemplary embodiment shown in FIGS. 1A and 1B, the multi-agent framework comprises a data access agent 105, a spatial selection agent 106, a data mining agent 107, a logical selection agent 108, a first display agent 109, a second display agent 110, a third display agent 111 and a fourth display agent 117, which may be collectively referred to as "the plurality of knowledge agents." Those of ordinary skill in the art will appreciate that other types of data agents may be created depending on a particular knowledge analysis need. An exemplary embodiment of the present invention may facilitate data integration by allowing a user to create and control the topology of the plurality of networked knowledge agents.

In one exemplary embodiment of the present invention the plurality of knowledge agents are implemented in a decentralized, loosely coupled manner. Each individual knowledge agent is adapted to perform specific tasks (or functions) such as data analysis, knowledge acquisition, data mining, data visualization or the like. The plurality of knowledge agents interact with each other by passing commands and information that creates dynamic links between them. In one exemplary embodiment of the invention related to creating visualizations of a subsurface environment, one or more 2D/3D display windows may be created to convey or annotate the various images which may comprise basic display elements such as horizon surfaces, well trajectories, production history charts or the like.

Each of the plurality of knowledge agents may employ unique local states and interfaces. In one exemplary embodiment, the plurality of knowledge agents can be constructed to form a direct graph topology to allow a workflow to be processed sequentially. One or more display agents may be used as end-nodes in the workflow to convey the display object in 2D/3D visual environment. In another exemplary embodiment, automatic schedule management may be employed to allow the network topology to be adjusted based on the data processing or data mining results.

In the exemplary embodiment of the invention depicted in FIGS. 1A and 1B, a user has configured to plurality of knowledge agents to perform an analysis of reservoir surveillance using production history and simulation data to predict/anticipate production/contact movement in an oil field. In particular, the user has defined the database 102, the application 103 and the external file 104 as sources of data. The data sources defined by the user may relate to production/injection wells, production history or geological database information to name just a few examples. Data types of interest may include wells and associated production data or events or the like. Data meeting the criteria identified by the user may be obtained by the data access agent 105. The state of the data access agent 105 can be saved to facilitate data retrieval/analysis in subsequent sessions.

Extracted data retrieved by the data access agent 105 is delivered to the data mining agent 107 via a data path A for comparison to other data populations received from other sources. For example, the data mining agent 107 may be adapted to analyze received data for the purpose of identifying all producing wells within the field with related geological/reservoir control information.

Alternately or in parallel with the evaluation of the extracted data by the data mining agent 107, the extracted data may also be delivered via a data path B to the spatial selection agent 106 to identify potential geological controls affecting the connectivity of wells in the field. By way of example, the user may program the spatial selection agent 106 to identify wells having connection to a set of specific compartments or a particular reservoir. The results of this analysis could be treated as a new data assemblage that could be delivered to the data mining agent 107, as shown in FIGS. 1A and 1B. In one exemplary embodiment of the present invention, the data assemblage produced by the spatial selection agent 106 represents injection/producing wells with known connect pathways. The data mining agent 107 could be programmed to compare oil and gas producing rates as well as factors affecting the connect movement.

Also alternately or in parallel with the operation of the data mining agent 107, the extracted data may be delivered to the logical selection agent 108 via a data path C. In the exemplary embodiment shown in FIGS. 1A and 1B, the logical selection agent 108 is adapted to create a new data assemblage representing a subset of all production data within the time period of the analysis. This data assemblage could be passed to the data mining agent 107 for comparison with other data assemblages to observe production trends for monitored wells.

The data mining agent 107 may be adapted to analyze/compare any of the generated data assemblages. For example, data retrieved in by the data access agent 105 and delivered directly to the data mining agent 107 (all wells and models and geological control), the data assemblage generated by the spatial selection agent 106 (compartments, wells and connectivity information), and the data assemblage produced by the logical selection agent 108 (wells with monthly production data) can be assembled and analyzed by the data mining agent 107 to assist in identifying relationships (e.g. contact movement related producing wells in the compartment) that can be used to explain and potentially predict future production and injection/producing configurations.

In the exemplary embodiment shown in FIGS. 1A and 1B, the data assemblage produced by the data access agent 105 is delivered to the first display agent 109. The first display agent 109 may be adapted to display this data as various geological object types such as faults, horizons and wells. The first display agent 109 may be programmed to display this data via a display path E using geographic mapping to represent a 3D earth model environment. The data assemblage produced by the logical selection agent 108 is delivered to the second display agent 110. The second display agent 110 may represent this data via a display path F in the form of time-animated pie charts. The time-animated pie charts may be used to convey monthly production data in which perforation zone locations in the wells are used for location mapping in a 3D earth model environment. The third display agent 111 is provided with pressure measurement data for a given well. The comparable 2D data plot may be used by the third display agent 111 to determine a TVD coordinate for data display in the 3D earth model environment to compare with other log properties of a given well. This information may be displayed via a display path G.

The collective outputs from the first display agent 109, the second display agent 110 and the third display agent 111 create a 2D/3D visual representation 112 corresponding to a subsurface region. In addition to merely portraying the subsurface region, the integrated 2D/3D visual representation 112 may comprise integrated 2D data based on information collected by the plurality of knowledge agents. In the exemplary embodiment shown in FIGS. 1A and 1B, the integrated 2D/3D visual representation 112 comprises a plurality of mapping identifiers. Examples of mapping identifiers are given the reference numbers 113 and 114 in FIG. 1B. The mapping identifiers 113 and 114 are in turn associated with criteria identifiers. In FIG. 1B, the mapping identifier 113 is associated with a criteria identifier 115 and the mapping identifier 114 is associated with a criteria identifier 116.

In one exemplary embodiment of the present invention, the criteria identifiers 115 and 116 correspond to 2D data objects identified by the plurality of knowledge agents. Moreover, the criteria identifiers 115 and 116 may represent such 2D data as an expected proportion of oil, gas or water at a particular location or the like. The representation of 2D data in the integrated 2D/3D visual representation 112 reflects the state of information intended to be integrated and conveyed by the specific configuration of the plurality of knowledge agents. In other words, the 2D information integrated into the integrated 2D/3D visual representation 112 represents specific criteria for which a user has configured the plurality of knowledge agents to examine the data obtained from the database 102, the application 103 and/or the external file 104.

In one exemplary embodiment of the present invention, the criteria identifiers 115 and 116 comprise iconic graphics or other graphic plots that are displayed to convey non-spatial data related to specific criteria without a static linkage attached to them. Instead, for deeper investigation of a specific data object corresponding to the criteria identifiers 115 and 116, the local state of the knowledge agents may be altered to retrieve and process new information and to display updated results in the same or separate display windows. Those of ordinary skill in the art will appreciate that a state of a visual control panel associated with the first display agent 109, the second display agent 110 and the third display agent 111 could be saved so that with each new session the data is automatically retrieved, processed, and displayed according to the user defined process flow.

In an alternative embodiment of the present invention, the knowledge agents associated with retrieval and analysis could work in the background (even if the display agents are not running) to constantly update perceived relationships (wisdom) as new data becomes available for processing and analysis. For example, as new information on drilling events within a field is obtained, the previously inferred relationship between faults and drilling events could be evaluated. In one exemplary embodiment of the present invention, data collected in real-time (e.g. production data) could be analyzed using the process flow (tools/agent assemblage) to reflect and determine the action to be taken during the reservoir surveillance process.

In the exemplary embodiment of the invention illustrated in FIGS. 1A and 1B, the output data produced by the data mining agent 107 and the logical selection agent 108 is delivered to the fourth display agent 117, which is adapted to provide a 2D representation 118 based on information obtained by the plurality of knowledge agents via a display path D. The 2D representation 118 may relate to the integrated 2D/3D visual representation 112 or may relate to other aspects of the information obtained by the plurality of knowledge agents. In the exemplary embodiment shown in FIG. 1B, the 2D representation 118 represents cumulated oil, gas and water with time data using a 2D line chart display and an XY mapping function to show the relationship of three kinds of data types: actual data, predicted data and simulated data. Those of ordinary skill in the art will appreciate that a state of a visual control panel associated with the fourth display agent 117 could be saved so that with each new session the data is automatically retrieved, processed, and displayed according to the user defined process flow.

Figure 2:
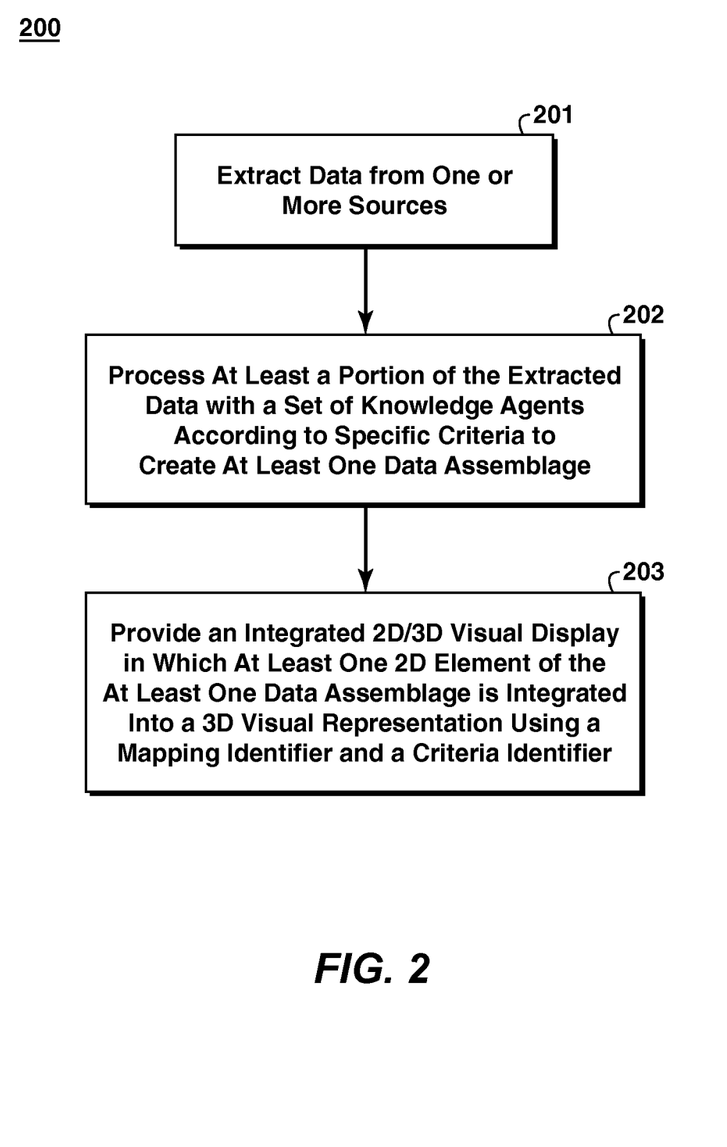
FIG. 2 is a process flow diagram that shows a method in accordance with an exemplary embodiment of the present invention.

FIG. 2 is a process flow diagram that shows a method in accordance with an exemplary embodiment of the present invention. The method is generally referred to by the reference number 200.

At block 201, data is extracted from one or more sources. As set forth above, the sources of data may comprise a wide range of formats such as database entries, web services, video input devices, real-time data collection processes or the like. The data may comprise any relevant data about a 2D/3D visual environment such as a shared earth environment. In one exemplary embodiment of the present invention, the data may be extracted from drilling information, daily/monthly production data, production history, exploration data and/or wellbore data to name just a few examples. The types of data included may include spatial data as well as non-spatial data such as temporal data. In one exemplary embodiment of the present invention, the data is extracted by a data access agent such as the data access agent 105 (FIG. 1A).

At block 202, at least a portion of the extracted data is processed by a set of knowledge agents according to specific criteria. As set forth above, the knowledge agents may comprise one or more spatial selection agents, one or more logical selection agents and/or one or more data mining agents. The knowledge agents may be configured by a user to identify data having specific characteristics relative to each other. As one example, the knowledge agents may be configured to analyze the data to determine occurrences of a particular data characteristic. Those of ordinary skill in the art will appreciate that the set of knowledge agents may be adapted to provide one or more assemblages of data based on the extracted data and the conditions provided to the knowledge agents by a user. Moreover, the knowledge agents may be adapted to accept commands from users, send/receive messages triggered by other events where specified conditions are met, or by user events (such as mouse clicking) in a 3D display window.

At block 203, an integrated 2D/3D visual display such as the integrated 2D/3D visual representation 112 (FIG. 1B) is provided based on at least a portion of the extracted data. In one exemplary embodiment of the present invention, the integrated 2D/3D visual display represents in part an earth model of a subsurface region. The integrated 2D/3D visual display may be provided by a display agent such as the first display agent 109, the second display agent 110 and the third display agent 111 (FIG. 1A). In one exemplary embodiment of the present invention, 2D components of the extracted data are indicated by a mapping identifier that identifies a location in the 3D spatial data and a criteria identifier that associates at least one specific criterion with the location indicated by the location identifier. The presentation of the 2D data in the 3D visual representation may be made in a wide range of forms. Examples of how the 2D data may be integrated include text, a map, 2D plots, icons, animated icons, spreadsheet data, web pages or the like.

Those of ordinary skill in the art will appreciate that one or more of the data assemblages produced by the set of knowledge agents may be used as input data for successive iterations of processing by one or more of the set of knowledge agents.

In one exemplary embodiment of the present invention, a visual control panel is created to easily recreate or update the integrated 2D/3D visual representation by users such as geoscientists or engineers. The visual control panel may embody a stored state of one or more of the set of knowledge agents. Those of ordinary skill in the art will appreciate that the visual control panel could be described by a directed graph similar to traditional computational steering environments or by loosely coupled processing agents.

Those of ordinary skill in the art will appreciate that one advantage that may be obtained using an exemplary embodiment of the present invention includes allowing the assembly of geological and engineering information, and spatial and temporal data in a processing stream. In addition, an exemplary embodiment of the present invention may allow a user to avoid the creation of static associations within graphic objects. Finally, an exemplary embodiment of the present invention may allow knowledge analysis and knowledge acquisition to be included in the processing stream.

What is claimed is:

1. A method of creating a visual display based on a plurality of data sources, the method comprising:
    extracting data from the plurality of data sources;
    processing at least a portion of the data extracted from the plurality of data sources with a set of knowledge agents according to user defined criteria to create at least one data assemblage; and
    providing an integrated two-dimensional/three-dimensional (2D/3D) visual display in which at least one 2D data element of the data extracted by the set of knowledge agents according to the user defined criteria is integrated into a 3D visual representation of an earth model, wherein the providing includes disposing the 2D data element at a position within the 3D visual representation according to a mapping identifier that indicates a location within the 3D visual representation where the 2D data element is to be displayed and a criteria identifier that associates the user defined criteria with the location indicated by the mapping identifier.

2. The method recited in claim 1, wherein the visual display corresponds to a subsurface region.

3. The method recited in claim 1, wherein the plurality of data sources represent a 3D earth model.

4. The method recited in claim 1, wherein the set of knowledge agents comprises at least one data access agent.

5. The method recited in claim 1, wherein the set of knowledge agents comprises at least one spatial selection agent.

6. The method recited in claim 1, wherein the set of knowledge agents comprises at least one logical selection agent.

7. The method recited in claim 1, wherein the set of knowledge agents comprises at least one data mining agent.

8. The method recited in claim 1, wherein the set of knowledge agents comprises at least one display agent.

9. The method recited in claim 1, comprising creating a visual control panel corresponding to the integrated 2D/3D visual display by storing a state of at least one of the set of knowledge agents.

10. The method recited in claim 1, wherein the criteria identifier comprises a graphic plot.

11. The method recited in claim 1, further comprising:
    using the set of knowledge agents to retrieve and process new data from the plurality of data sources; and
    updating the 2D data element based on the new data.

12. The method recited in claim 11, wherein the set of knowledge agents collect the new data in real time.

13. The method recited in claim 1, wherein the 2D data element comprises non-spatial data associated with a subsurface region.

14. The method recited in claim 13, wherein the non-spatial data comprises one or more of drilling information, geochemical or geomechanical analysis results, or production data.

15. The method recited in claim 1, wherein the criteria identifier represents an expected proportion of oil, gas or water at a particular location.

16. The method recited in claim 1, wherein the data sources are associated with one or more of production wells, injection wells, production history and geological information.

17. A non-transitory machine-readable medium, comprising:
  code adapted to extract data from a plurality of data sources;
  code adapted to correspond to a set of knowledge agents that process at least a portion of the data extracted from the plurality of data sources with a set of knowledge agents according to user defined criteria to create at least one data assemblage; and
  code adapted to provide an integrated two-dimensional/three-dimensional (2D/3D) visual display in which at least one 2D data element of the data extracted by the set of knowledge agents according to the user defined criteria is integrated into a 3D visual representation of an earth model, wherein the providing includes disposing the 2D data element at a position within the 3D visual representation according to a mapping identifier that indicates a location within the 3D visual representation where the 2D data element is to be displayed and a criteria identifier that associates the user defined criteria with the location indicated by the mapping identifier.

18. The non-transitory machine-readable medium recited in claim 17, wherein the integrated 2D/3D visual display corresponds to a subsurface region.

19. The non-transitory machine-readable medium recited in claim 17, wherein the set of knowledge agents comprises at least one data access agent, at least one spatial selection agent, at least one logical selection agent or at least one data mining agent.

20. The non-transitory machine-readable medium recited in claim 17, wherein the code adapted to provide an integrated 2D/3D visual display comprises a display agent.

21. The non-transitory machine-readable medium recited in claim 17, wherein the plurality of data sources represent a 3D earth model.

22. The non-transitory machine-readable medium recited in claim 17, wherein the criteria identifier comprises a graphic plot.

* * * * *